United States Patent

Principe et al.

[11] Patent Number: 5,918,345
[45] Date of Patent: Jul. 6, 1999

[54] CLEANING APPARATUS

[75] Inventors: Rene Principe; Walter Koller, both of Munchwilen, Switzerland

[73] Assignee: Diversey Lever, Inc., Plymouth, Mich.

[21] Appl. No.: 08/808,757

[22] Filed: Mar. 3, 1997

[30] Foreign Application Priority Data

Mar. 1, 1996 [EP] European Pat. Off. ............ 96103125

[51] Int. Cl.⁶ .................................................. A47L 5/00
[52] U.S. Cl. ........................................... 15/340.3; 15/320
[58] Field of Search .................... 15/320, 340.1, 15/340.3, 340.2, 340.4

[56] References Cited

U.S. PATENT DOCUMENTS

| | | | |
|---|---|---|---|
| 3,277,511 | 10/1966 | Little et al. | 15/340.3 X |
| 4,339,841 | 7/1982 | Waldhauser et al. | 15/359 |
| 4,492,002 | 1/1985 | Waldhauser et al. | 15/320 |
| 5,239,720 | 8/1993 | Wood et al. | 15/320 X |
| 5,383,251 | 1/1995 | Whitaker et al. | 15/320 |
| 5,623,743 | 4/1997 | Burgoon et al. | 15/320 |

FOREIGN PATENT DOCUMENTS

| | | |
|---|---|---|
| 2 607 076 | 5/1988 | France . |
| 6168027 | 6/1994 | Japan . |

*Primary Examiner*—Chris K. Moore

[57] ABSTRACT

An apparatus for cleaning a surface is described. The apparatus has a frame and a cleaning member with a brush that rotates on the frame to clean a floor. The apparatus also has main support wheels drive unit, and an auxiliary drive unit with an auxiliary wheel to improve the mobility of the apparatus.

6 Claims, 2 Drawing Sheets

CLEANING APPARATUS

FIELD OF THE INVENTION

The present invention relates to a floor cleaning machine. In particular, it relates to a machine suitable for wet cleaning, having a suction means for drawing up cleaning liquid applied to the floor surface.

BACKGROUND OF THE INVENTION

Cleaning of large floor areas is usually carried out, in practice, using an apparatus which is manually pushed forward by an operator. Such apparatus, usually contain a tank for fresh cleaning liquid as well as a tank for the used liquid sucked up again after cleaning, and can therefore be bulky and heavy. As a consequence, they may be difficult to push forward and move about. Similar are further known wherein the rear wheels are driven, for which purpose comparatively heavy drive and transmission means are then required which result in an increase in the weight of the apparatus and decrease its mobility.

An object of the present invention is to improve the mobility of such manually operated or machine driven floor cleaning apparatus.

SUMMARY OF THE INVENTION

The present invention provides an apparatus for cleaning a ground, having
- a frame,
- a cleaning member arranged rotatably on the frame and first drive means for rotatable driving thereof,
- one or more wheels arranged on the frame, and
- an auxiliary drive unit having an auxiliary wheel arranged on the frame and second drive means for assisting in the forward movement of the apparatus.

BRIEF DESCRIPTION OF THE INVENTION

The second drive means for assisting the forward movement of the apparatus according to the invention, is usually relatively lightly constructed and a heavy transmission via a differential or the like can generally be omitted. As a result, the mobility of the apparatus according to the invention is improved. The mobility of the apparatus according to the present invention is also improved by the preferred position of the auxiliary wheel, i.e. roughly between the rear wheels.

The auxiliary wheel is preferably fixed to a pivotable arm which is pivotable between a position close to the vertical and a slightly rearward position as seen in the travel direction of the apparatus. When driven by the second drive means, the auxiliary wheel pushes off against the ground surface and presses itself under the machine, whereby a good contact with the ground surface is obtained and the drive force of the auxiliary wheel (which generally has relatively small dimensions) is optimal. Unevenness in the ground does not represent a problem due to the pivotable arm.

The cleaning apparatus according to the present invention is preferably provided with a single disc-shaped, rotatably drivable cleaning member arranged on the front side of the apparatus which can co-assist the driving of the apparatus, for instance in that a slightly greater pressure force is exerted on this drive member on a sideward position than on the position located opposite. Reference is made in this respect to the E.P 788,761, the content of which should be deemed as incorporated herein.

BRIEF DESCRIPTION OF THE DRAWING

Further advantages, features and details of the present invention will become apparent in the light of the following description of a preferred embodiment thereof with reference to the annexed drawings, in which.

Figure 1:
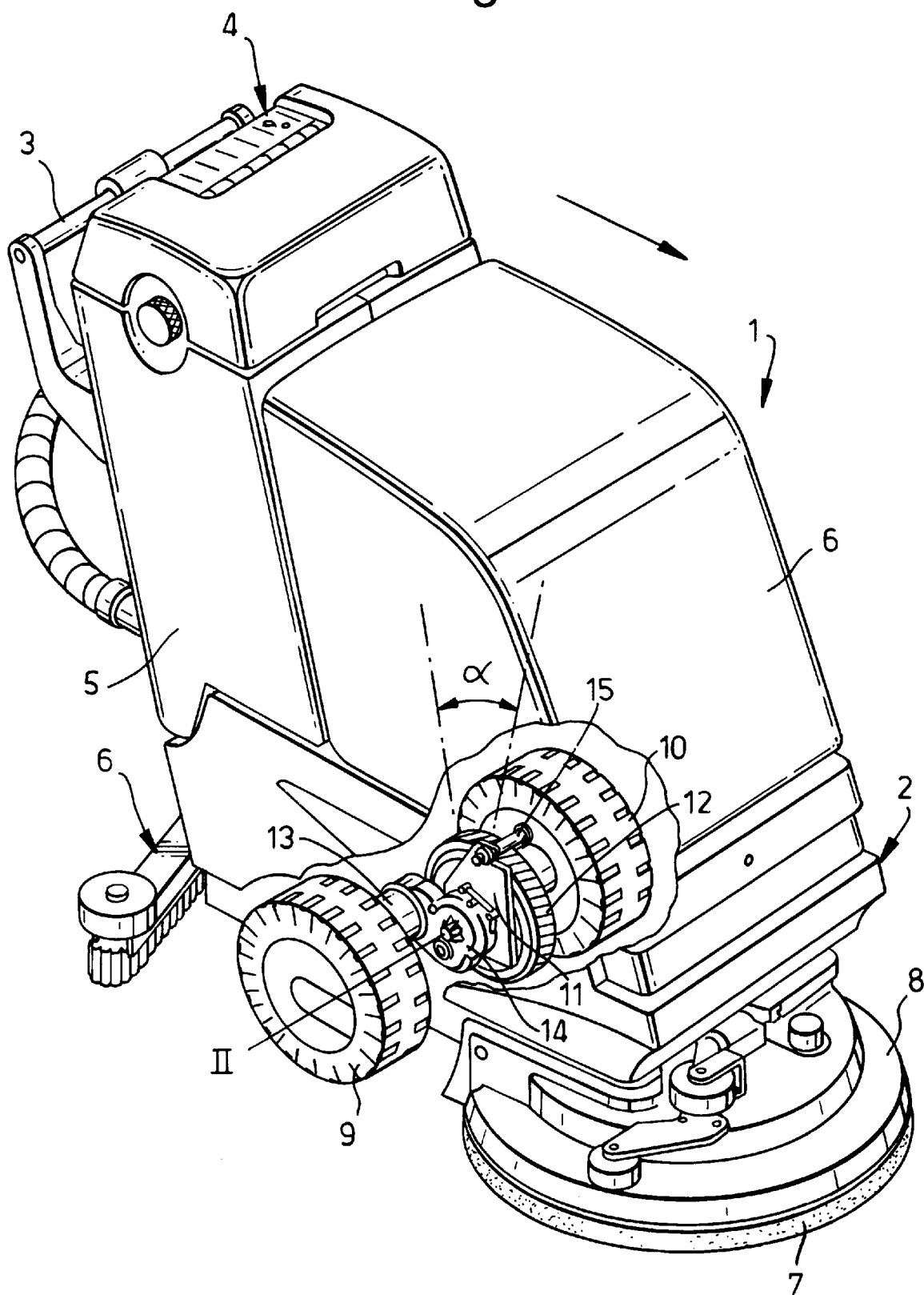
FIG. 1 shows a partly broken away view in perspective of a preferred embodiment of an apparatus according to the present invention.

A preferred embodiment of a floor cleaning apparatus (1) according to the present invention comprises a frame (2) on which is arranged a push bar (3) for enabling the user to manually push forward the apparatus (1). Close to push-bar (3) is arranged a control panel (4) provided with switches and buttons for the various functions such as ON/OFF, SUCTION, DRIVE etc. The scrubber further comprises a first tank (5) and a second tank (6), of which for instance tank (6) contains fresh cleaning liquid for supplying thereof to the area under a brush (7) which is arranged on a disc (8) rotatable on a vertical axis. Stored in tank (5) is for instance used cleaning liquid which is sucked up from the floor using a suction element or a so-called squeegee. The E.P. 788,761 of applicant describes how a drive force can be derived using the reactive force of the ground on the rotating brush.

An auxiliary wheel (12) is arranged on a pivot arm (11) between rear wheels (9), (10) which in this embodiment are non-driven, which auxiliary wheel is driven using an electric motor (13) and a reduction gear unit (14), both of which are likewise arranged on pivot arm (11). This drive wheel is preferably situated roughly between the wheels of the scrubber.

Figure 2:
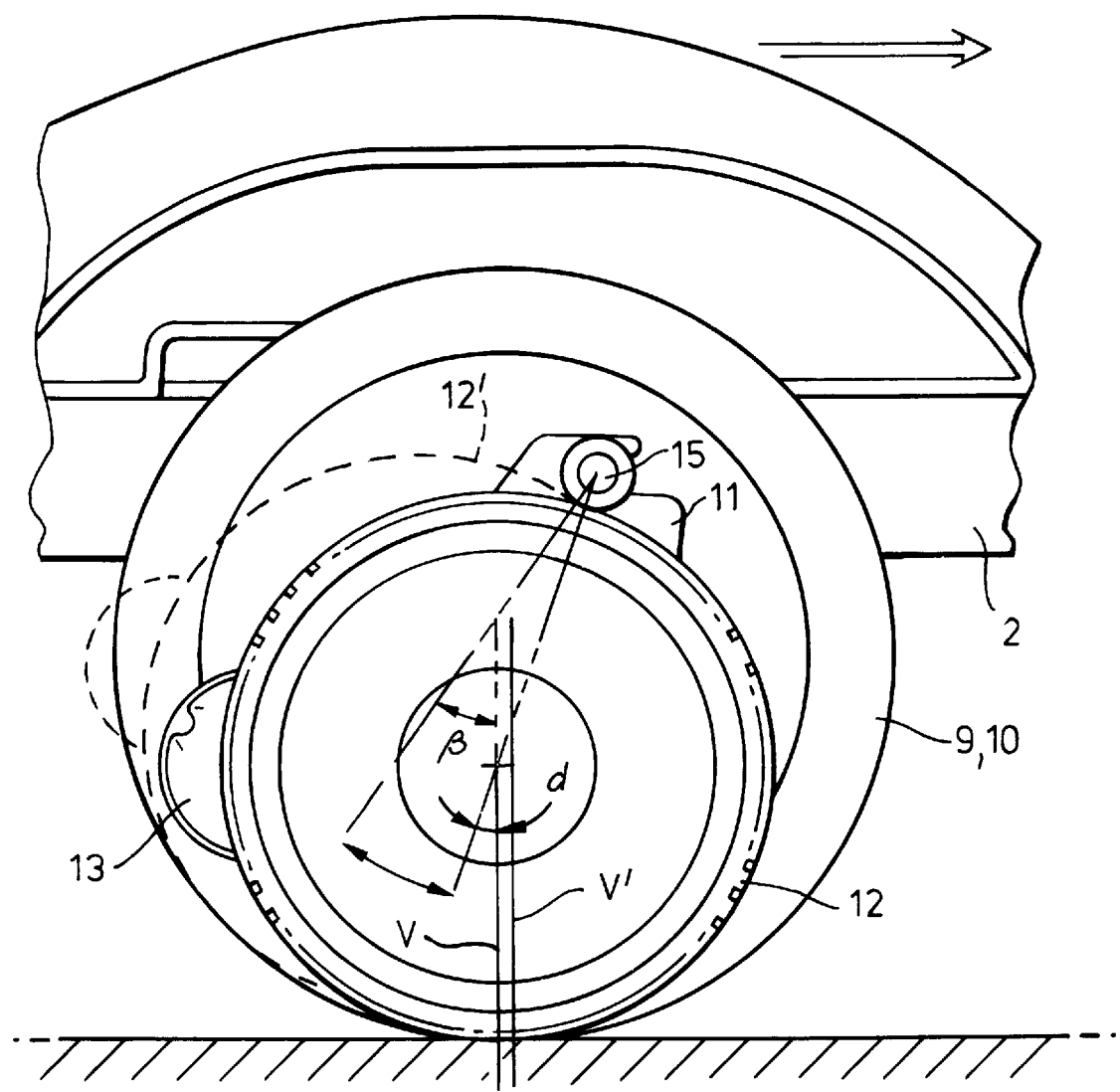
FIG. 2 is a slightly schematic side view of detail II of FIG. 1.

FIG. 2 shows that, due to the arm (11) which is arranged on a pivot shaft (15) mounted on the frame, during use the pivot shaft extends in a vertical direction relative to the vertical V depending on the position of the scrubber and possible unevenness in the ground surface at brush (7) or lower wheel (12). The position of wheel (12) drawn in full lines extends at a smaller angle α, for instance in the order of magnitude of 5–10° relative to the vertical V, than the position 12' drawn with broken lines which extends for instance at an angle β of roughly 20–45° relative to the vertical V. When the electric motor (13) is set into operation to drive auxiliary wheel (12), as a result of the reactive force of the ground the wheel (12) is pressed into the position wherein this wheel is situated closest to the vertical, whereby the contact with the ground is as optimal as possible due to the weight of apparatus (1). In a manner not shown, a stop for pivot arm (11) can be arranged on the chassis to prevent the arm moving through the vertical position, in which undesired position the drive force of the auxiliary wheel (12) is lost. The length of the pivot arm is preferably such that the angle with the vertical can never become smaller than 5°. Nor must the angle be greater than 45°, more preferably about 30°, in rearward direction of the vertical, since otherwise the friction force between ground and auxiliary wheel (12) is determined to a lesser extent by the weight of the machine, whereby the drive force of auxiliary wheel (12) can decrease considerably.

In case the tread of the auxiliary wheel (12) becomes worn, the latter will automatically seek a position located slightly closer to the vertical and the drive force thereof thereby remains as optimal as possible.

It is emphasized that the floor cleaning apparatus shown in the Figures illustrates only a preferred embodiment of the invention and that various constructional alternatives will be immediately evident to the person skilled in the art, without departing from the scope of the present invention.

We claim:

1. An apparatus for cleaning a surface comprising:
   a) a frame;
   b) a cleaning member rotatably arranged on the frame, and a first drive means for rotatably driving the cleaning member;
   c) two rear wheels arranged on the frame; and
   d) an auxiliary drive unit comprising an auxiliary wheel arranged on the frame substantially between the two rear wheels and second drive means for driving the auxiliary wheel and assisting the forward movement of the apparatus.

2. The apparatus according to claim 1 wherein the auxiliary wheel and the second drive means are positioned substantially beneath the center of gravity of the apparatus.

3. The apparatus according to claim 1 wherein the auxiliary wheel is arranged on a lever arm for pivoting the auxiliary wheel on the frame.

4. The apparatus according to claim 3 wherein the second drive means is arranged on a pivotable arm.

5. The apparatus according to claim 3 wherein the lever arm is pivotable at a comparatively small angle relative to the vertical through the center of the auxiliary wheel, said angle being not smaller than 5° in a rearward direction relative to the vertical and not greater than 30° in a rearward direction relative to the vertical.

6. The apparatus according to claim 1 wherein the cleaning member comprises a disc rotatable in a substantially horizontal plane.

* * * * *